US012629732B2

(12) United States Patent
Smith et al.

(10) Patent No.: US 12,629,732 B2
(45) Date of Patent: May 19, 2026

(54) FIREARM BORE CLEANER

(71) Applicant: AOB Products Company, Columbia, MO (US)

(72) Inventors: Eric Smith, Columbia, MO (US); James Tayon, Moberly, MO (US); Michael Cottrell, Ashland, MO (US); Jarrod Grove, Columbia, MO (US)

(73) Assignee: AOB Products Company, Columbia, MO (US)

( * ) Notice: Subject to any disclaimer, the term of this patent is extended or adjusted under 35 U.S.C. 154(b) by 0 days.

(21) Appl. No.: 18/483,674

(22) Filed: Oct. 10, 2023

(65) Prior Publication Data

US 2024/0033787 A1 Feb. 1, 2024

Related U.S. Application Data

(62) Division of application No. 17/444,263, filed on Aug. 2, 2021.

(60) Provisional application No. 63/060,018, filed on Aug. 1, 2020.

(51) Int. Cl.
*B08B 9/045* (2006.01)
*F41A 29/02* (2006.01)

(52) U.S. Cl.
CPC .............. *B08B 9/045* (2013.01); *F41A 29/02* (2013.01); *B08B 2209/04* (2013.01)

(58) Field of Classification Search
CPC . F41A 29/00; F41A 29/02; B08B 9/04; B08B 9/045; B08B 2209/04
See application file for complete search history.

(56) References Cited

U.S. PATENT DOCUMENTS

| | | | |
|---|---|---|---|
| 621,857 | A | 3/1899 | Scott |
| 882,598 | A | 3/1908 | Ward et al. |
| 1,164,665 | A | 12/1915 | Reeves |
| 1,172,746 | A | 2/1916 | Silverstein |
| 3,708,820 | A | 1/1973 | Schultea |
| 5,171,925 | A | 12/1992 | Mekler |
| 5,871,589 | A | 2/1999 | Hedge |
| 5,972,125 | A | 10/1999 | Hedge |
| 6,088,866 | A | 7/2000 | Hedge |
| 6,630,034 | B1 | 10/2003 | Schnell |
| 6,889,402 | B2 | 5/2005 | Galantai |
| 7,367,151 | B1 | 5/2008 | Black et al. |
| 7,441,363 | B1 | 10/2008 | Black et al. |

(Continued)

FOREIGN PATENT DOCUMENTS

FR 2848656 A1 6/2004

*Primary Examiner* — Natasha N Campbell
(74) *Attorney, Agent, or Firm* — Stinson LLP

(57) ABSTRACT

A firearm bore cleaner for cleaning a bore of a firearm includes a cleaning segment and a pulling segment. The cleaning segment cleans the bore of the firearm when the cleaning segment is moved along the bore. The cleaning segment includes a tail end connector adjacent a tail end portion. The pulling segment is sized and shaped to be inserted into the bore. The pulling segment includes a head end connector adjacent the head end portion of the pulling segment. A tail end portion of the pulling segment is connected to a head end portion of the cleaning segment. The head end connector of the pulling segment and the tail end connector of the cleaning segment can be releasably connect to each other to couple the head end portion of the pulling segment and the tail end portion of the cleaning segment together in order to form a closed loop.

52 Claims, 4 Drawing Sheets

(56) References Cited

U.S. PATENT DOCUMENTS

| | | | |
|---|---|---|---|
| 8,572,883 | B2 | 11/2013 | Markle |
| 8,943,731 | B2 | 2/2015 | Niebling |
| 9,228,790 | B2 | 1/2016 | Stephens et al. |
| 9,339,349 | B2 | 5/2016 | Pisacane |
| 9,658,021 | B2 | 5/2017 | Brooker |
| 9,702,654 | B2 | 7/2017 | Brooker |
| 10,240,895 | B2 | 3/2019 | Kokoruda et al. |
| 10,254,070 | B2 | 4/2019 | Briody et al. |
| 10,401,116 | B1 | 9/2019 | Kokoruda et al. |
| 2002/0157200 | A1 | 10/2002 | Galantai |
| 2004/0111948 | A1 | 6/2004 | Schnell |
| 2011/0099880 | A1 | 5/2011 | Stephens et al. |
| 2012/0198747 | A1 | 8/2012 | Niebling |
| 2013/0125925 | A1 | 5/2013 | Markle |
| 2014/0250614 | A1 | 9/2014 | Pisacane |
| 2016/0223282 | A1 | 8/2016 | Brooker |
| 2016/0223283 | A1 | 8/2016 | Brooker |
| 2017/0146313 | A1 | 5/2017 | Briody et al. |
| 2019/0137209 | A1 | 5/2019 | Navarro |

FIREARM BORE CLEANER

CROSS-REFERENCE TO RELATED APPLICATION

This application is a division of U.S. Nonprovisional patent application Ser. No. 17/444,263, filed Aug. 2, 2021, and claims priority to U.S. Provisional Application No. 63/060,018, filed Aug. 1, 2020, the entirety of which is hereby incorporated by reference.

FIELD

The present disclosure generally relates to weapon cleaners and more particularly to bore cleaners for a bore of a firearm.

BACKGROUND

Firearms use an explosive charge to shoot a round (e.g., bullet, etc.) through a bore of a barrel. After each shoot, residue from the explosive charge and the round may be left within the bore. The residue can build up over time, negatively impacting the firearm's accuracy and overall performance. To maintain the firearm in proper working order, the bore of the barrel is periodically cleaned to remove any build-up of residue.

SUMMARY

In one aspect, a firearm bore cleaner for cleaning a bore of a firearm comprises a cleaning segment having an elongate cleaning body sized and shaped to clean the bore of the firearm when the cleaning segment is moved along the bore of the firearm. The cleaning segment has a head end portion and an opposite tail end portion. The cleaning segment includes a tail end connector adjacent the tail end portion. A pulling segment has an elongate pulling body sized and shaped to be inserted into the bore of the firearm. The pulling segment has a head end portion and an opposite tail end portion. The pulling segment includes a head end connector adjacent the head end portion of the pulling segment. The tail end portion of the pulling segment is connected to the head end portion of the cleaning segment. The head end connector of the pulling segment and the tail end connector of the cleaning segment are configured to releasably connect to each other to couple the head end portion of the pulling segment and the tail end portion of the cleaning segment together such that the cleaning segment and the pulling segment form a closed loop.

In another aspect, a method of cleaning a bore of a firearm with a firearm bore cleaner comprises inserting a head end connector of a pulling segment of the firearm bore cleaner through the bore of the firearm. A tail end portion of the pulling segment is connected to a head end portion of a cleaning segment of the firearm bore cleaner such that the cleaning segment moves with the pulling segment. The method further includes connecting the head end connector of the pulling segment to a tail end connector of the cleaning segment to form a closed loop that extends through the bore of the firearm and continuously moving the closed loop through the bore to clean the bore.

In another aspect, a method of forming a firearm bore cleaner comprises inserting an end of an elongate fabric tube through an opening in the elongate fabric tube and into a lumen of the elongate fabric tube to form a loop at a tail end of the elongate fabric tube, inserting a portion of a tether into the opening and into the lumen of the elongate fabric tube, sewing the tether and the end of elongate fabric tube to the elongate fabric tube, and connecting a tail end connector to a tail end of the tether. The tail end is opposite the portion of the tether sewn to the elongate fabric tube. The method further includes connecting a head end connector to an elongate pulling body. The head end connector is configured to releasably attach to the tail end connector. The method further includes connecting a tail end of the elongate pulling body to a head end of the elongate fabric tube. The head end of the elongate fabric tube is opposite the tail end.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
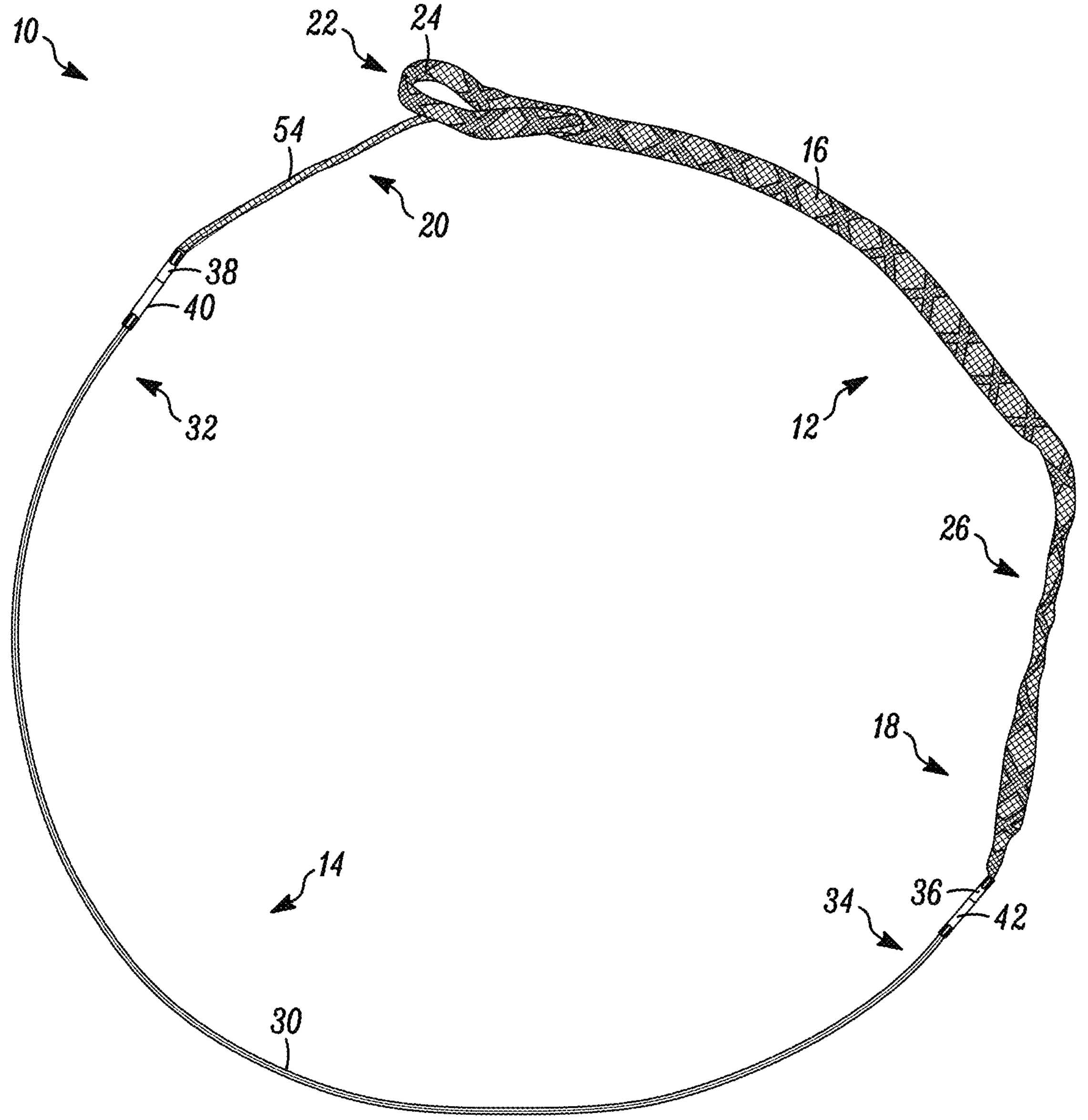
FIG. 1 is an illustration of a firearm bore cleaner according to one embodiment of the present disclosure.

Referring to FIG. 1, one embodiment of a firearm bore cleaner of the present disclosure is generally indicated by reference numeral 10. The firearm bore cleaner 10 is used to clean a bore (not shown) of a firearm (not shown). In use, the firearm bore cleaner 10 is pulled along the bore of the firearm to capture residue in the bore. The firearm bore cleaner 10 includes a cleaning segment 12 and a pulling segment 14. The cleaning segment 12 includes an elongate cleaning body 16 sized and shaped to clean the bore of the firearm when the cleaning segment is moved along the bore of the firearm. For example, the elongate cleaning body 16 may have a width or diameter at least as large as the diameter of the bore to ensure the elongate cleaning body engages the interior surface of the firearm defining the bore when the elongate body is pulled through the bore. The cleaning segment 12 includes a head end portion 18 and an opposite tail end portion 20. The elongate cleaning body 16 includes a first or head end and an opposite rear or tail end. The head end of the elongate cleaning body 16 is generally at the head end portion 18 and the tail end of the elongate cleaning body is generally at the tail end portion 20. The elongate cleaning body 16 can be made of any suitable material able to capture and/or dislodge the residue within the bore. The elongate cleaning body 16 is desirably made of a flexible material. In the illustrated embodiment, the elongate cleaning body 16 comprises an elongate fabric tube. The elongate fabric tube defines a lumen extending along its length. The illustrated elongate fabric tube is formed of braided fibers. An elongate cleaning body made of other materials is within the scope of the present disclosure.

Figure 2:
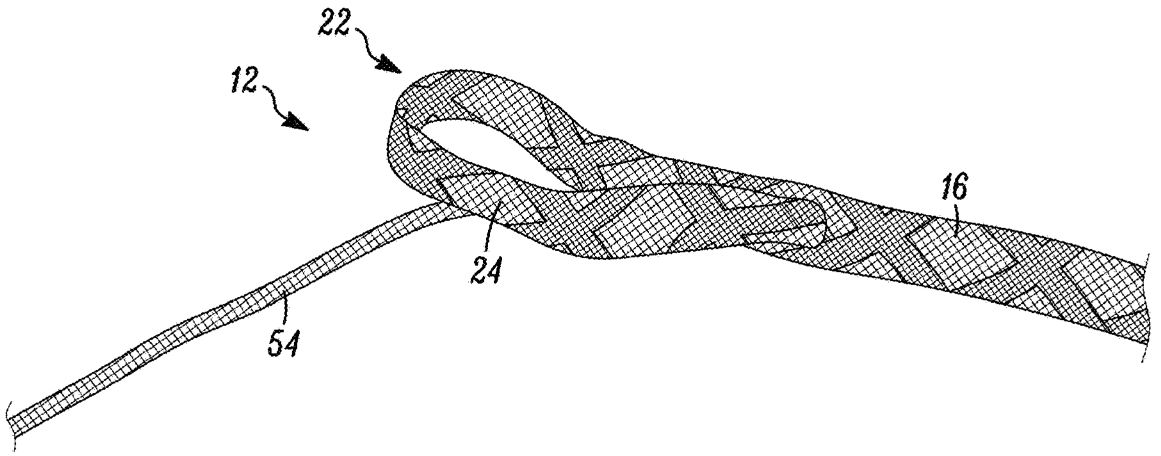
FIG. 2 is an enlarged view of a loop of the firearm bore cleaner.

Referring to FIGS. 1 and 2, desirably, the cleaning segment 12 includes a solvent carrier 22. The solvent carrier 22 assists in absorbing and holding solvent and residue. Solvent is commonly used to help remove the residue from the bore. The solvent carrier 22 holds the solvent to wipe the solvent along the bore as the firearm bore cleaner 10 is moved along the bore. In the illustrated embodiment, the solvent carrier 22 comprises a loop 24 of the elongate cleaning body 16 at the tail end of the elongate cleaning body (broadly, at the tail end portion 20 of the cleaning segment 12). Other types of solvent carriers, such as foam, are within the scope of the present disclosure and could be used instead of or in addition to the loop 24. Accordingly, the cleaning segment 12 can include more than one solvent carrier. In addition, one or more solvent carriers can be disposed at other positions on the firearm bore cleaner 10, such as at the head end of the elongate cleaning body 16.

Figure 3:
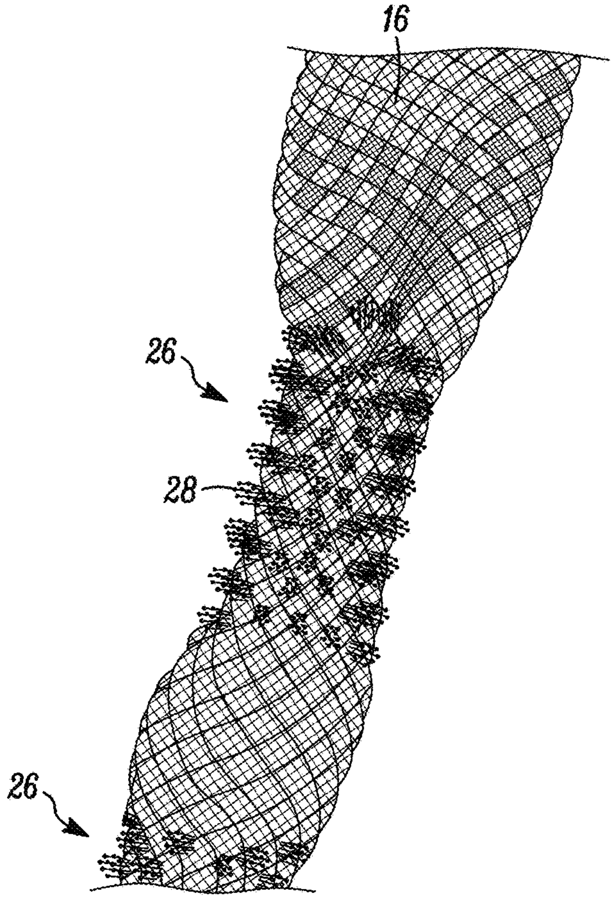
FIG. 3 is an enlarged view of a brush of the firearm bore cleaner.

Referring to FIG. 3, the cleaning segment 12 may also include one or more brushes 26. In the illustrated embodiment, the cleaning segment 12 includes two brushes 26, although more or fewer brushes are within the scope of the present disclosure. The brushes 26 are mounted on the elongate cleaning body 16. In the illustrated embodiment, the brushes 26 generally extend radially outward from the elongate cleaning body 16. The brushes 26 are adjacent to one another and positioned by the head end portion 18 of the cleaning segment 12 (e.g., positioned toward the head end of the elongate cleaning body 16). Each brush 26 includes bristles 28 (e.g., wire bristles) extending out of the elongate cleaning body 16. The bristles 28 engage (e.g., form an interference fit with) the bore of the firearm to clean, scrub, wipe and dislodge residue therein, as the cleaning segment is moved through the bore. Other types of cleaning/scrubbing/wiping/abrasive elements can be incorporated into the cleaning segment without departing from the scope of the present disclosure.

Referring back to FIG. 1, the pulling segment 14 has a head end portion 32 and an opposite tail end portion 34. The pulling segment 14 includes an elongate pulling body 30 sized and shaped to be inserted into the bore of the firearm. The elongate pulling body 30 includes a first or head end and an opposite rear or tail end. The head end of the elongate pulling body 30 is generally at the head end portion 32 and the tail end of the elongate pulling body is generally at the tail end portion 34. The elongate pulling body 30 is flexible. The elongate pulling body 30 may comprise a cord (such as a plastic coated cable), a rope or any other suitable material. The primary purpose of the pulling segment 14 is to be pulled by a user in order to move the firearm bore cleaner 10 along the bore of the firearm to clean the bore. However, in some embodiments, the pulling segment 14 may include one or more cleaning elements, such as absorbent tubing (similar to the elongate cleaning body 16), brushes, jags, etc.

The cleaning segment 12 and the pulling segment 14 are connectable end-to-end to form a closed loop. As explained in more detail below, the closed loop makes it easier to repeatedly move the cleaning segment 12 through the bore of the firearm to clean the bore. To form the closed loop, the tail end portion 34 of the pulling segment 14 is connected to the head end portion 18 of the cleaning segment 12. Likewise, the head end portion 32 of the pulling segment 14 is connected to the tail end portion 20 of the cleaning segment 12. In the illustrated embodiment, the cleaning segment 12 and the pulling segment 14 are configured to make two connections therebetween to form the loop. At least one of these connections is releasable. In the illustrated embodiment, both connections are releasable. When the connections are not formed, the cleaning segment 12 and the pulling segment 14 are free of connection to each other and are movable with respect to one another. When at least one of the connections is formed, the cleaning segment 12 and the pulling segment 14 move with each other. In an alternative embodiment, the one of the connections can be non-releasable or fixed and the other connection can be releasable. For example, the connection between the tail end portion 34 of the pulling segment 14 and the head end portion 18 of the cleaning segment 12 can be non-releasable and the connection between the head end portion 32 of the pulling segment 14 and the tail end portion 20 of the cleaning segment 12 can be releasable, or vice versa. Having at least one releasable connection enables the firearm bore cleaner 10 to be threaded through the bore of the firearm before the closed loop is formed.

Figure 4:
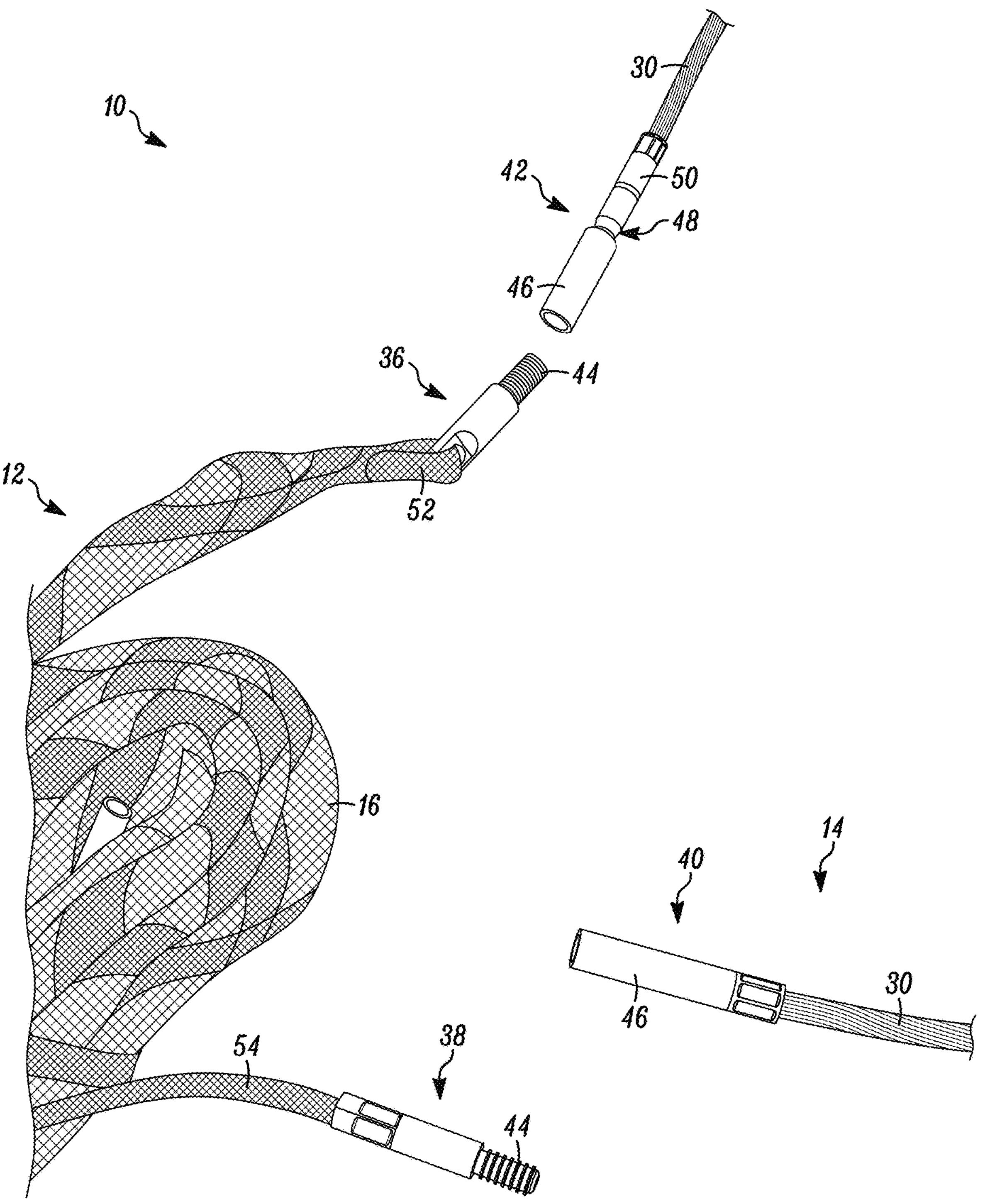
FIG. 4 is an enlarged view of the connectors of the firearm bore cleaner.

Referring to FIGS. 1 and 4, in the illustrated embodiment, the cleaning segment 12 and the pulling segment 14 include releasable connectors adjacent (e.g., at) each end portion to connect the cleaning and pulling segments together. The cleaning segment 12 includes a head end connector 36 adjacent the head end portion 18 and a tail end connector 38 adjacent the tail end portion 20. In the illustrated embodiment, the head end connector 36 defines (e.g., is at) the head end of the cleaning segment 12 and the tail end connector 28 defines (e.g. is at) the tail end of the cleaning segment. The pulling segment 14 includes a head end connector 40 adjacent the head end portion 32 and a tail end connector 42 adjacent the tail end portion 34. In the illustrated embodiment, the head end connector 40 defines (e.g., is at) the head end of the pulling segment 14 and the tail end connector 42 defines (e.g., is at) the tail end of the pulling segment. The head end connector 40 of the pulling segment 14 and the tail end connector 38 of the cleaning segment 12 are configured to releasably connect together to couple or connect the head end portion 32 of the pulling segment and the tail end portion 20 of the cleaning segment together. The tail end connector 42 of the pulling segment 14 and the head end connector 36 of the cleaning segment 12 are configured to releasably connect together to couple the tail end portion 34 of the pulling segment and the head end portion 18 of the cleaning segment together. When the connectors 36, 38, 40, 42 are connected together, the cleaning segment and the pulling segment form the closed loop.

In the illustrated embodiment, each connector 36, 38, 40, 42 is a threaded connector. Each connector 36, 38, 40, 42 includes a threaded portion configured to threadably connect each set of connectors together. The head and tail end connectors 36, 38 of the cleaning segment 12 are male connectors. Each of the head and tail end connectors 36, 38 of the cleaning segment 12 include a threaded portion 44 (e.g., a male threaded portion). Each threaded portion 44 has external threads. The head and tail end connectors 40, 42 of the pulling segment 14 are female connectors. Each of the head and tail end connectors 40, 42 of the pulling segment 14 include a threaded portion 46 (e.g., a female threaded portion). The threaded portions 46 have internal threads and are configured to receive the respective threaded portions 44 of the head and tail end connectors 36, 38 of the cleaning segment 12. Threadably connecting the threaded portions 44, 46 of the head end connector 40 of the pulling segment 14 and the tail end connector 38 of the cleaning segment attaches the head end portion 32 of the pulling segment and the tail end portion 20 of the cleaning segment together (broadly, forms the connection between the head end of the pulling segment and the tail end of the cleaning segment). Threadably connecting the threaded portions 44, 46 of the head end connector 36 of the cleaning segment 12 and the tail end connector 42 of the pulling segment 14 attaches the head end portion 18 of the cleaning segment and the tail end portion 34 of the pulling segment together (broadly, forms the connection between the head end of the cleaning segment and the tail end of the pulling segment).

The firearm bore cleaner 10 includes at least one swivel 48 (FIG. 4) to permit the cleaning segment 12 and the pulling segment 14 (or a portion thereof) to rotate to facilitate connecting the cleaning segment and the pulling segment to form the loop. In one embodiment, at least one of the connectors 36, 38, 40, 42 includes a swivel 48. Desirably, at least one of the tail end connector 38 of the cleaning segment 12 and the head end connector 40 of the pulling segment 14 includes a swivel 48. For example, both the tail end connector 38 of the cleaning segment 12 and the head end connector 40 of the pulling segment 14 can include a swivel 48. In one embodiment, the tail end connector 38 of the cleaning segment 12 includes the swivel 48. In this embodiment, the swivel 48 is operatively disposed between the threaded portion 44 of the tail end connector 38 of the cleaning segment 12 and the elongate cleaning body 16 to permit the threaded portion of the tail end connector of the cleaning segment to rotate relative to the elongate cleaning body of the cleaning segment when the tail end connector of the cleaning segment and the head end connector 40 of the pulling segment 14 are being threadably attached to one another. In another embodiment, the head end connector 40 of the pulling segment 14 includes the swivel 48. In this embodiment, the swivel 48 is operatively disposed between the threaded portion 46 of the head end connector 40 of the pulling segment 14 and the elongate pulling body 30 to permit the threaded portion of the head end connector of the pulling segment to rotate relative to the elongate pulling body of the pulling segment when the tail end connector 38 of the cleaning segment 12 and head end connector of the pulling segment are being threadably attached to one another.

In one embodiment, at least one of the tail end connector 42 of the pulling segment 14 and the head end connector 36 of the cleaning segment 12 includes a swivel 48. For example, both the tail end connector 42 of the pulling segment 14 and the head end connector 36 of the cleaning segment 12 can include a swivel 48. In one embodiment, the head end connector 36 of the cleaning segment 12 includes the swivel 48. In this embodiment, the swivel 48 is operatively disposed between the threaded portion 44 of the head end connector 36 of the cleaning segment 14 and the elongate cleaning body 16 to permit the threaded portion of the head end connector of the cleaning segment to rotate relative to the elongate cleaning body of the cleaning segment when the tail end connector 42 of the pulling segment 14 and head end connector of the cleaning segment are being threadably attached to one another. In another embodiment and as illustrated, the tail end connector 42 of the pulling segment 14 includes the swivel 48. In this embodiment, the swivel 48 is operatively disposed between the threaded portion 46 of the tail end connector 42 of the pulling segment 14 and the elongate pulling body to permit the threaded portion of the tail end connector of the pulling segment to rotate relative to the elongate pulling body of the pulling segment when the tail end connector of the pulling segment and the head end connector 36 of the cleaning segment 12 are being threadably attached to one another.

Any number of the connectors 36, 38, 40, 42 can include a swivel 48. Having a swivel 48 in at least one of the connectors 36, 38, 40, 42 allows portions of the cleaning segment 12 and/or pulling segment 14 to rotate relative to one another when two connectors are being threadably connected (broadly, when the cleaning and pulling segments are being connected together to form the closed loop). This makes it easier to attach one set of end portions of the cleaning segment 12 and the pulling segment 14 together to form the closed loop when the other set of end portions are already connected together. The swivel 48 allows the cleaning segment 12 and the pulling segment 14 to be connected to form the at least one connection without twisting the cleaning segment or the pulling segment. For example, the head end connector 40 of the pulling segment 14 and the tail end connector 38 of the cleaning segment 12 can be threaded together to make a first connection between the cleaning and pulling segments. Then, the head end connector 36 of the cleaning segment 12 and the tail end connector 42 of the pulling segment 14 can be threaded together to make a second connection between the cleaning and pulling segments and form the closed loop. The swivel 48 permits the threaded portion 46 of the tail end connector 42 of the pulling body 14 to rotate relative to the elongate pulling body 30 such that the elongate pulling body does not twist as the second connection is made.

Without at least one swivel 48, making the first connection between the cleaning segment 12 and the pulling segment 14 would generally inhibit or make it more difficult to rotate and attach the loose set of connectors 36, 38, 40, 42 to make the second connection and form the closed loop. In addition, the rotations required to connect the loose set of connectors 36, 38, 40, 42 to form the second connection and the closed loop would twist the cleaning segment 12 and/or pulling segment 14, and this twisting would be present in the closed loop, which would negatively impact the performance of the firearm bore cleaner 10 as it is being moved through the bore of the firearm. The swivel 48 can generally be disposed anywhere on the firearm bore cleaner 10 to permit rotation and does not have to be incorporated into one of the connectors 36, 38, 40, 42, such as one of the connectors of the loose set of connectors that are connected to form the closed loop. In this embodiment, the swivel 48 is separate from the connectors 36, 38, 40, 42 but permits rotations of one or more of the connectors relative to a component of the firearm bore cleaner 10 (broadly, permits rotation of the two connectors being connected relative to each other without requiring the twisting of the cleaning and/or pulling segments 12, 14) to prevent twisting or winding of a component (e.g., the elongate cleaning body 16, the elongate pulling body 30) of the firearm bore cleaner on itself as the threaded connection is made between two connectors to form the closed loop. Other types of connectors are within the scope of the present disclosure. For example, the connectors can be snap-fit connectors. The swivel may not be necessary in a firearm bore cleaner using other types of connectors if the connectors do not require rotation relative to one another to connect and disconnect. However, the swivel may still be included to provide other benefits such as reducing the effects of any twisting and winding applied by a user while pulling the firearm bore cleaner along the bore of the firearm.

Figure 5:
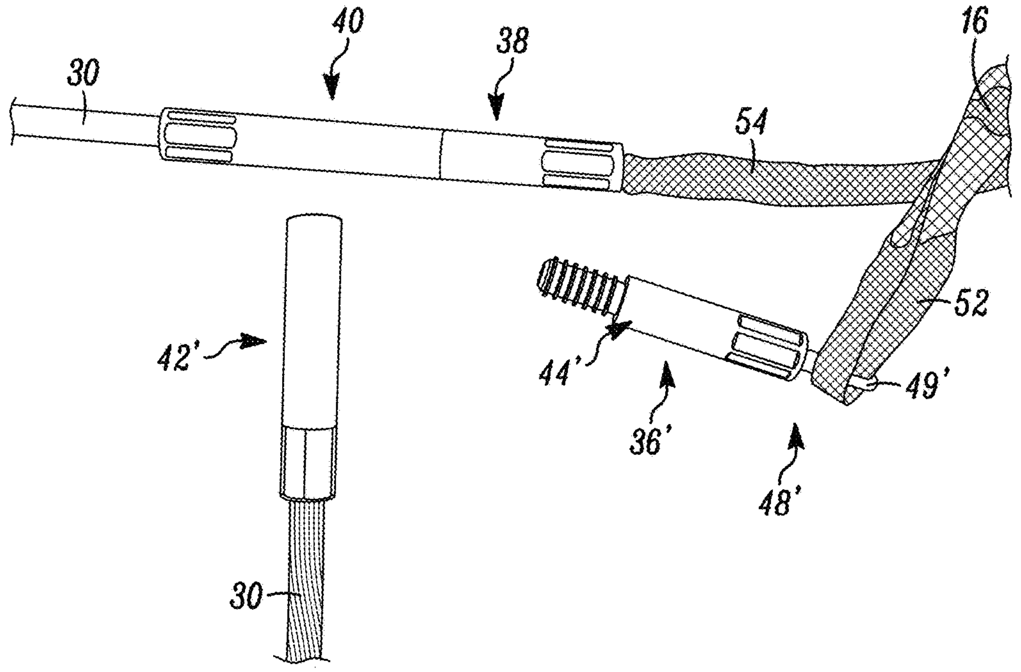
FIG. 5 is an enlarged view of connectors of a firearm bore cleaner according to another embodiment of the present disclosure.

Still referring to FIGS. 1 and 4, in the illustrated embodiment, the firearm bore cleaner 10 includes one swivel 48. The tail end connector 42 of the cleaning segment 14 includes the swivel 48. The tail end connector 42 includes a cord connecting portion 50 attached to the tail end of the elongate pulling body 30. In the illustrated embodiment, the cord connecting portion 50 is crimped on the elongate pulling body 30 but other ways of attaching the cord connecting portion to the elongate pulling body are within the scope of the present disclosure. In the illustrated embodiment, the head end connector 40 of the pulling segment 14 is also crimped onto the head end of the elongate pulling body 30. The cord connecting portion 50 of the tail end connector 42 supports the threaded portion 46 of the tail end connector. The threaded portion 46 is rotatable with respect to the cord connecting portion 50. For example, the swivel 48 may include a socket (not shown) of the threaded portion 46 that receives and captures a protrusion (not shown) of the cord connecting portion 50 (or vice versa) such that the threaded portion is rotatable with respect to the cord connecting portion. Other configurations of the swivel are within the scope of the present disclosure. For example, FIG. 5 illustrates a swivel, generally indicated by reference numeral 48', according to another embodiment of the present disclosure. In this embodiment, the swivel 48' includes an eyelet pin 49' rotatably connected to the threaded portion 44'. In this embodiment, the head end connector 48' of the cleaning segment 12 includes the swivel 48' and the tail end connector 42' of the pulling segment 14 does not include a swivel. A thread or cord 52 extends through the eyelet of the eyelet pin 49' to connect the head end connector 36' to the elongate cleaning body 16. Referring back to FIG. 4, the head end connector 36 of the cleaning segment 12 is also connected to the elongate cleaning body 16 with a thread or cord 52.

Referring to FIGS. 1, 2 and 4, the cleaning segment 12 includes a tether 54 attached to the elongate cleaning body 16. The tether 54 extends rearward from the elongate cleaning body 16. The tether 54 is flexible. The tether 54 comprises a cord (e.g., a fabric cord, a plastic coated cable, etc.). The tether 54 defines at least a portion of the tail end portion 20 of the cleaning segment 12. The tail end connector 38 of the cleaning segment 12 is attached to the tether 54 (e.g., is attached to a tail end thereof). In the illustrated embodiment, the tail end connector 38 attached to the tether 54 by crimping. In one embodiment, the tether 54 is attached to the elongate cleaning body 16 with stitches. For example, a portion of the tether 54 can extend into the lumen of the elongate cleaning body 16 (such as through an opening between fibers of the elongate cleaning body) and be connected to the elongate cleaning body 16 with one or more stitches.

The combined length of the cleaning segment 12 and the pulling segment 14 is at least twice the length of the bore to be cleaned, so that the firearm bore cleaner 10 can extend into one end of the bore, through the bore, out the other end of the bore, and be connected to itself outside of the bore to form the closed loop. Desirably, the combined length of the cleaning and pulling segments 12, 14 is greater than the length of the bore to be cleaned to provide slack and clearance to permit the user to manipulate the portion of the firearm bore cleaner 10 exposed outside the bore to pull the firearm bore cleaner along or through the bore. Any combination of the lengths of the cleaning segment 12 and the pulling segment 14 can be used to form the total length of the firearm bore cleaner 10. For example, the cleaning and pulling segments 12, 14 can be of equal lengths or unequal lengths. For instance, the pulling segment 14 can be longer than the cleaning segment 12 or vice versa. Desirably, the pulling segment 14 is longer than the length of the bore so that a portion of the pulling segment will always be disposed outside the bore (regardless of the position of the bore along the closed loop) for a user to manipulate to pull the firearm bore cleaner 10 along the bore.

Figure 6:
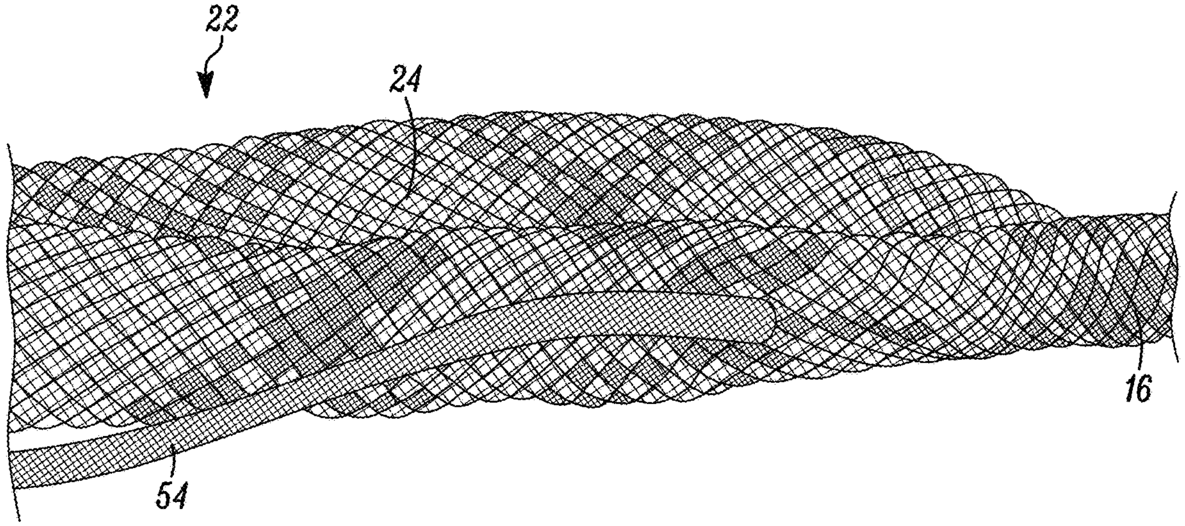
FIG. 6 is an enlarged view of a tail end portion of a cleaning segment of a firearm bore cleaner according to another embodiment of the present disclosure.

One method of forming the firearm bore cleaner 10 will not be described. To form the cleaning segment 12, first a length of material (e.g., flexible fabric tube) is cut to a desired length for forming the elongate cleaning body 16. To form the loop 24, an end of the elongate cleaning body 16 (e.g., the elongate fabric tube) is inserted through an opening in the elongate cleaning body and into the lumen of the elongate cleaning body. This forms the loop 24 at the tail end of the elongate cleaning body 16. The opening may be formed by separating fibers of the elongate cleaning body 16. In the illustrated embodiment, stiches can be sewn into the elongate cleaning body 16 to secure the inserted end of the elongate cleaning body to the rest of the elongate cleaning body. Other ways of forming the loop, such as with adhesive, are within the scope of the present disclosure. The tether 54 is also secured or attached to the elongate cleaning body 16. This can be done in various ways and at various locations. For example, the tether 54 can be attached to the loop 24 or on the elongate cleaning body 16 toward the head end of the loop. In the illustrated embodiment, a portion of the tether 54 is inserted into an opening of the elongate cleaning body 16 and into the lumen of the elongate cleaning body. The tether 54 can be inserted into the same opening as the end of the elongate cleaning body 16 that forms the loop 24, as shown in FIGS. 1 and 2, or a separate opening, as shown in FIG. 6. Stiches can then be sewn into the elongate cleaning body 16 to secure the inserted portion of the tether 54 to the elongate cleaning body. These can be the same stitches securing the inserted end of the elongate cleaning body 16 to the rest of the elongate cleaning body to form the loop 24 or separate stitches. The one or more brushes 26 are mounted on the elongate cleaning body 16. Finally, the head and tail end connectors 36, 38 are attached. The cord 54 is inserted through an eyelet of the head end connector 36 and then the cord is attached to the elongate cleaning body 16, such as by sewing stitches. The tail end connector 38 is attached to a tail end of the tether 54, such as by crimping. The tail end of the tether 54 is opposite the portion of the tether sewn to the elongate support member 16.

To form the pulling segment 12, a length of material (e.g., a cord, plastic coated cable, etc.) is cut to a desired length for forming the elongate pulling body 30. The head and tail end connectors 40, 42 are then attached. The head end connector 40 is attached to the elongate pulling body 30 (e.g., a head end thereof), such as by crimping. Similarly, the tail end connector 42 is attached to the elongate pulling body 30 (e.g., a tail end thereof), such as by crimping. With the cleaning and pulling segments 12, 14 formed, these segments can now be connected together. The tail end portion 34 of the pulling segment 14 (e.g., the tail end of the elongate pulling body 30) can be attached to the head end portion 18 of the cleaning segment 12 (e.g., the head end of the elongate cleaning body 16) via the head end connector 36 and the tail end connector 42 to form the first connection. If desired, the tail end portion 20 of the cleaning segment 12 (e.g., the tail end of the elongate cleaning body 16) can be attached to the head end portion 32 of the pulling segment 14 (e.g., the head end of the elongate pulling body 30) via the tail end connector 38 and the head end connector 40 to form the second connection. The firearm bore cleaning tool 10 may be sold with the cleaning and pulling segments 12, 14 separate from each other (e.g., with neither connection formed), with one connection formed, or with both connections formed.

A method of cleaning the bore of the firearm will now be described. In general, the cleaning and/or pulling segments 12, 14 are threaded through the bore and then connected together to form the closed loop. To form the loop, the head end connector 36 of the cleaning segment 12 and the tail end connector 42 of the pulling segment 14 are connected together and the head end connector 40 of the pulling segment and the tail end connector 38 of the cleaning segment are connected together. Alternatively, the other ends of the cleaning and pulling segments 12, 14 could be connected, by flipping the orientation of the pulling segment. After the firearm bore cleaner 10 is looped, the firearm bore cleaner is pulled continuously to repeatedly move the cleaning segment 12 through the bore (broadly, the firearm bore cleaner is pulled continuously through the bore) until the bore is sufficiently clean. Specifically, in one method of cleaning the bore of the firearm, first the head end connector 40 of the pulling segment 14 is inserted through the bore of the firearm. At this step, the pulling and cleaning segments 12, 14 can already be attached to each other via the end connectors 36, 42 such that the cleaning segment move with the pulling segment or the cleaning and pulling segments can be attached together after the pulling segment is inserted into the bore. After the head end connector 40 of the pulling segment 14 is inserted through the bore, the head end connector of the pulling segment is attached to the tail end connector 38 of the cleaning segment 12, thereby forming the closed loop that extends through the bore of the firearm. The head end connector 40 of the pulling segment 14 and the tail end connector 38 of the cleaning segment 12 are threadably coupled together. The at least one swivel 48 rotates during the attachment of the head end connector 40 of the pulling segment 14 and the tail end connector 38, to eliminate the effect twisting these connectors relative to one another has on the remaining components of the firearm bore cleaner, as described herein. After the closed loop is formed, the firearm bore cleaner 10 is then moved continuously through the bore to clean the bore. The user repeatedly grips the pulling segment 14 and/or cleaning segment 12 to move the cleaning segment head end first into and through the bore to clean the bore. A solvent (not shown) may be applied to the cleaning segment 12, such as to the solvent holder 22, before or during this step to help remove the residue from the bore. The user repeatedly moves the cleaning segment 12 through the bore until the bore is sufficiently cleaned. After the cleaning is completed, the user disconnects at least one set of connectors 36, 38, 40, 42 to break the closed loop. The user can disconnect the head end connector 40 of the pulling segment 14 and the tail end connector 38 of the cleaning segment 12 and/or the head end connector 36 of the cleaning segment and the tail connector 42 of the pulling segment. After at least one of the connections is broken, the user pulls any remaining portion of the cleaning segment 12 and/or pulling segment 14 out of the bore.

The looped firearm bore cleaner 10 makes it easier and faster to clean the bore by enabling the user to only move or pull the firearm bore cleaner 10 in one direction and does not require the user to manually realign the cleaning segment 12 with the bore of the firearm each time the cleaning segment is inserted into the bore, unlike conventional firearm bore cleaners. Because the firearm bore cleaner 10 is threaded through the bore and forms a closed loop, the cleaning segment 12 will automatically become aligned with the bore before each insertion into the bore as the user pulls the firearm bore cleaner.

When introducing elements of the present disclosure or the preferred embodiments(s) thereof, the articles “a”, “an”, “the” and “said” are intended to mean that there are one or more of the elements. The terms “comprising”, “including” and “having” are intended to be inclusive and mean that there may be additional elements other than the listed elements.

It will be apparent that modifications and variations are possible without departing from the scope defined in the appended claims.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A method of cleaning a bore of a firearm with a firearm bore cleaner, the method comprising:

inserting a head end connector of a pulling segment of the firearm bore cleaner through the bore of the firearm, a tail end portion of the pulling segment connected to a head end portion of a cleaning segment of the firearm bore cleaner;

connecting the head end connector of the pulling segment to a tail end connector of the cleaning segment to form a closed loop that extends through the bore of the firearm; and repeatedly moving the closed loop through the bore to clean the bore;

wherein the cleaning segment comprises an elongate cleaning body and a tether attached to the elongate cleaning body, the tail end connector being attached to the tether.

2. The method of claim 1, wherein said connecting includes threadably coupling the head and tail end connectors together.

3. The method of claim 2, wherein at least one of the tail end connector and the head end connector includes a swivel, the swivel rotating during said connecting.

4. The method of claim 1, further comprising attaching a head end connector of the cleaning segment and a tail end connector of the pulling segment to attach the tail end portion of the pulling segment to the head end portion of a cleaning segment.

5. The method of claim 4, wherein said attaching the head end connector of the cleaning segment and the tail end connector of the pulling segment includes threadably coupling the head end connector of the cleaning segment and tail end connector of the pulling segment together.

6. The method of claim 5, wherein at least one of the tail end connector of the pulling segment and the head end connector of the cleaning segment includes a swivel, the swivel rotating during said attaching.

7. The method of claim 1, further comprising:

disconnecting the head and tail end connectors after the bore is sufficiently cleaned; and pulling any remaining portion of the cleaning segment and/or pulling segment out of the bore.

8. The method of claim 1, further comprising applying a solvent to the cleaning segment of the firearm bore cleaner.

9. The method of claim 8, wherein said applying the solvent occurs before said continuously moving the closed loop through the bore to clean the bore.

10. The method of claim 8, wherein said applying the solvent occurs during continuously moving the closed loop through the bore to clean the bore.

11. The method of claim 8, wherein said applying a solvent includes applying the solvent to a solvent carrier of the firearm bore cleaner.

12. The method of claim 1, wherein the cleaning segment includes at least a portion forming an interference fit in the bore to clean the bore as the closed loop is continuously moved through the bore.

13. The method of claim 1, wherein said continuously moving the closed loop through the bore to clean the bore includes repeatedly moving the head end connector of the pulling segment and the tail end connector of the cleaning segment through the bore.

14. The method of claim 1, wherein the cleaning segment includes a brush, and wherein said continuously moving the closed loop through the bore to clean the bore includes repeatedly moving the brush through the bore.

15. The method of claim 1, wherein the elongate cleaning body is thicker than the tether.

16. The method of claim 1, wherein the elongate cleaning body comprises a flexible fabric tube and a fabric loop.

17. The method of claim 1, wherein the cleaning segment comprises a fabric loop disposed between the head end connector and the tail end connector before the closed loop is formed and spaced apart along a length of the firearm bore cleaner from the head end connector and the tail end connector before the closed loop is formed.

18. A method of cleaning a bore of a firearm, the method comprising:

inserting a front end of a firearm bore cleaner through the bore of the firearm, the firearm bore cleaner including an elongate cleaning segment and an elongate pulling segment, the pulling segment having a first thickness, the cleaning segment including a first cleaning section and a second cleaning section, the first cleaning section having a second thickness greater than the first thickness, the second cleaning section comprising a fabric loop and having a third thickness greater than the second thickness, the fabric loop being rearward of the front end;

connecting the front end of the firearm bore cleaner to another portion of the firearm bore cleaner rearward of the fabric loop to form a closed loop that extends through the bore of the firearm; and repeatedly moving the closed loop through the bore to clean the bore.

19. The method of claim 18, wherein said another portion of the firearm bore cleaner is a rear end of the firearm bore cleaner.

20. The method of claim 18, wherein the elongate pulling segment forms the front end of the firearm bore cleaner.

21. The method of claim 18, wherein the firearm bore cleaner includes a brush, and wherein said continuously moving the closed loop through the bore to clean the bore includes repeatedly moving the brush through the bore.

22. The method of claim 18, further comprising applying a solvent to the firearm bore cleaner.

23. The method of claim 18, wherein a portion of the firearm bore cleaner forms an interference fit in the bore to clean the bore as the closed loop is continuously moved through the bore.

24. The method of claim 18, wherein the pulling segment comprises a flexible cord and the first cleaning section of the cleaning segment comprises a flexible fabric tube.

25. The method of claim 18, wherein the cleaning segment includes a tether extending rearward of the fabric loop.

26. The method of claim 25, wherein the tether is thinner than the third thickness.

27. The method of claim 25, wherein the tether is thinner than the second and third thicknesses.

28. The method of claim 25, wherein said another portion of the firearm bore cleaner is a rear end of the firearm bore cleaner, wherein the tether is disposed between the rear end of the firearm bore cleaner and the fabric loop before the closed loop is formed.

29. The method of claim 18, wherein the first cleaning section is elongate and has a length extending along a length of the firearm bore cleaner and the second cleaning section is elongate and has a length extending along the length of the firearm bore cleaner.

30. A method of cleaning a bore of a firearm with a firearm bore cleaner, the method comprising:

inserting a head end connector of a pulling segment of the firearm bore cleaner through the bore of the firearm, a tail end portion of the pulling segment connected to a head end portion of a cleaning segment of the firearm bore cleaner;

connecting the head end connector of the pulling segment to a tail end connector of the cleaning segment to form a closed loop that extends through the bore of the firearm; and repeatedly moving the closed loop through the bore to clean the bore;

wherein the pulling segment comprises a flexible cord, wherein the cleaning segment comprises a flexible fabric tube and a fabric loop.

31. The method of claim 30, wherein said connecting includes threadably coupling the head and tail end connectors together.

32. The method of claim 31, wherein at least one of the tail end connector and the head end connector includes a swivel, the swivel rotating during said connecting.

33. The method of claim 30, further comprising:

disconnecting the head and tail end connectors after the bore is sufficiently cleaned; and pulling any remaining portion of the cleaning segment and/or pulling segment out of the bore.

34. The method of claim 30, further comprising applying a solvent to the cleaning segment of the firearm bore cleaner.

35. The method of claim 30, wherein the cleaning segment includes at least a portion forming an interference fit in the bore to clean the bore as the closed loop is continuously moved through the bore.

36. The method of claim 30, wherein the cleaning segment includes a brush, and wherein said continuously moving the closed loop through the bore to clean the bore includes repeatedly moving the brush through the bore.

37. The method of claim 30, wherein the cleaning segment comprises an elongate cleaning body and a tether attached to the elongate cleaning body, the tail end connector being attached to the tether.

38. The method of claim 37, wherein the elongate cleaning body is thicker than the tether.

39. A method of cleaning a bore of a firearm with a firearm bore cleaner, the method comprising:

inserting a head end connector of a pulling segment of the firearm bore cleaner through the bore of the firearm, a tail end portion of the pulling segment connected to a head end portion of a cleaning segment of the firearm bore cleaner;

connecting the head end connector of the pulling segment to a tail end connector of the cleaning segment to form a closed loop that extends through the bore of the firearm; and repeatedly moving the closed loop through the bore to clean the bore;

wherein the cleaning segment comprises a fabric loop and a tether, the tether extending between the tail end connector and the fabric loop.

40. The method of claim 39, wherein said connecting includes threadably coupling the head and tail end connectors together.

41. The method of claim 40, wherein at least one of the tail end connector and the head end connector includes a swivel, the swivel rotating during said connecting.

42. The method of claim 39, further comprising:

disconnecting the head and tail end connectors after the bore is sufficiently cleaned; and pulling any remaining portion of the cleaning segment and/or pulling segment out of the bore.

43. The method of claim 39, further comprising applying a solvent to the cleaning segment of the firearm bore cleaner.

44. The method of claim 39, wherein the cleaning segment includes at least a portion forming an interference fit in the bore to clean the bore as the closed loop is continuously moved through the bore.

45. The method of claim 39, wherein the cleaning segment includes a brush, and wherein said continuously moving the closed loop through the bore to clean the bore includes repeatedly moving the brush through the bore.

46. A method of cleaning a bore of a firearm with a firearm bore cleaner, the method comprising:

inserting a head end connector of a pulling segment of the firearm bore cleaner through the bore of the firearm, a tail end portion of the pulling segment connected to a head end portion of a cleaning segment of the firearm bore cleaner;

connecting the head end connector of the pulling segment to a tail end connector of the cleaning segment to form a closed loop that extends through the bore of the firearm; and repeatedly moving the closed loop through the bore to clean the bore;

wherein the cleaning segment comprises a fabric loop disposed between the head end connector and the tail end connector before the closed loop is formed and spaced apart along a length of the firearm bore cleaner from the head end connector and the tail end connector before the closed loop is formed.

47. The method of claim 46, wherein said connecting includes threadably coupling the head and tail end connectors together.

48. The method of claim 47, wherein at least one of the tail end connector and the head end connector includes a swivel, the swivel rotating during said connecting.

49. The method of claim 46, further comprising:

disconnecting the head and tail end connectors after the bore is sufficiently cleaned; and pulling any remaining portion of the cleaning segment and/or pulling segment out of the bore.

50. The method of claim 46, further comprising applying a solvent to the cleaning segment of the firearm bore cleaner.

51. The method of claim 46, wherein the cleaning segment includes at least a portion forming an interference fit in the bore to clean the bore as the closed loop is continuously moved through the bore.

52. The method of claim 46, wherein the cleaning segment includes a brush, and wherein said continuously moving the closed loop through the bore to clean the bore includes repeatedly moving the brush through the bore.

* * * * *